(12) United States Patent
Zhao

(10) Patent No.: US 10,286,508 B2
(45) Date of Patent: May 14, 2019

(54) MACHINING FIXTURE

(71) Applicant: CITIC Dicastal CO., LTD, Qinhuangdao (CN)

(72) Inventor: Tieshi Zhao, Qinhuangdao (CN)

(73) Assignee: CITIC Dicastal CO., LTD, Qinhuangdao (CN)

( * ) Notice: Subject to any disclaimer, the term of this patent is extended or adjusted under 35 U.S.C. 154(b) by 268 days.

(21) Appl. No.: 15/413,847

(22) Filed: Jan. 24, 2017

(65) Prior Publication Data
US 2017/0209970 A1  Jul. 27, 2017

(30) Foreign Application Priority Data
Jan. 26, 2016  (CN) .......................... 2016 1 0050919

(51) Int. Cl.
*B23Q 1/00* (2006.01)
*B23Q 3/18* (2006.01)
*B05B 13/02* (2006.01)

(52) U.S. Cl.
CPC ............. *B23Q 3/183* (2013.01); *B23Q 1/009* (2013.01); *B23Q 1/0081* (2013.01); *B05B 13/0228* (2013.01); *B23Q 1/0018* (2013.01)

(58) Field of Classification Search
CPC ...... B23Q 3/183; B23Q 1/0081; B23Q 1/009; B23Q 3/082; B23Q 1/0018; B25B 5/061; B23B 31/30
USPC .......................................... 269/25, 310, 48.1
See application file for complete search history.

(56) References Cited

U.S. PATENT DOCUMENTS

| | | | |
|---|---|---|---|
| 2008/0061486 A1* | 3/2008 | Kuroda | B23Q 1/0081 269/48.1 |
| 2012/0156966 A1* | 6/2012 | Mulder | B05B 13/0228 451/28 |
| 2014/0353894 A1* | 12/2014 | DesJardien | B23P 19/10 269/21 |
| 2018/0304379 A1* | 10/2018 | Shimizu | B23Q 1/009 |

* cited by examiner

*Primary Examiner* — Christopher M Koehler
*Assistant Examiner* — Mahdi H Nejad
(74) *Attorney, Agent, or Firm* — Maier & Maier, PLLC

(57) ABSTRACT

A machining fixture, comprising a base, an air cylinder, an air cylinder piston and connecting rod, a supporting guide sleeve, a sliding supporting seat, a thrust ball bearing holder and spherical bead, a floating platform, a first connecting screw, a compression block, a pin shaft, a push rod pin, a second connecting screw, a center positioning shaft, a third connecting screw, a guide sleeve, a supporting plate, an oil cylinder piston and connecting rod and a one-way oil cylinder. The floating centering self-clamping machining fixture is for machining flange-type, which improves positioning accuracy and machining precision. The fixture has an automatic returning floating platform, achieving the automatic alignment of the parts; after the alignment, a floating support moves down and is changed to a rigid support, improving stability; and a positioning rod continues to move down, such that a workpiece is automatically clamped by an ejector rod oscillating arm mechanism.

5 Claims, 2 Drawing Sheets

MACHINING FIXTURE

TECHNICAL FIELD

The present invention relates to the field of machining, and more particularly to a machining fixture.

BACKGROUND ART

Traditional fixtures always face difficulties when it comes to positioning, and thus it is difficult for them to achieve horizontal placement and accurate centralized positioning of a part with a large weight. Consequently, a machined feature position is large in offset. Meanwhile, the tightening of traditional fixtures adopts the connection of clip nuts, which needs to be done manually.

SUMMARY OF THE INVENTION

Hence, it is an object of the present invention to provide a machining fixture, thereby guaranteeing the horizontal placement and accurate centralized positioning of a relatively heavy part and providing relatively convenient operation.

In one aspect of the present invention, a machining fixture is provided, comprising a base (1), an air cylinder (2), an air cylinder piston and connecting rod (3), a supporting guide sleeve (4), a sliding supporting seat (5), a thrust ball bearing holder and spherical bead (6), a floating platform (7), a first connecting screw (8), a compression block (9), a pin shaft (10), a push rod pin (11), a second connecting screw (12), a center positioning shaft (13), a third connecting screw (15), a guide sleeve (16), a supporting plate (17), an oil cylinder piston and connecting rod (18) and a one-way oil cylinder (19), and the machining fixture is characterized in that: the one-way oil cylinder (19) is connected to the base (1) by means of a bolt through the supporting plate (17), the guide sleeve (16) and the base (1) are in small clearance fit with each other and fixed by means of the third connecting screw (15), an oil cylinder connecting rod (18) of the one-way oil cylinder (19) penetrates through the base (1) through the guide sleeve (16), and the center positioning shaft (13) is installed to the top end of the oil cylinder piston and connecting rod (18) by means of the second connecting screw (12); the air cylinder (2) is fixed to the base (1) by means of a bolt, the supporting guide sleeve (4) and the base (1) are in small clearance fit with each other and fixed by means of the first connecting screw (8), the air cylinder piston and connecting rod (3) of the air cylinder (2) penetrates through the base (1) through the supporting guide sleeve (4) and is connected to the sliding supporting seat (5), and the holder and spherical bead (6) is arranged on the sliding supporting seat (5); the floating platform (7) is configured to be arranged on the holder and spherical bead (6) at a regulation state and on the sliding supporting seat (5) at a working state of workpiece machining; the compression block (9) and the pin shaft (10) are fixed respectively to the center positioning shaft (13) to maintain stationary; and the push rod pin (11) is arranged between the floating platform (7) and the supporting guide sleeve (4).

In a preferred aspect of the present invention, the supporting guide sleeve (4) comprises a supporting guide sleeve mounting foot (401), a supporting guide sleeve mounting bolt hole (402), a supporting guide sleeve cylindrical main body (403) and a friction sleeve (404); the supporting guide sleeve mounting foot (401) is disposed at a bottom end of the supporting guide sleeve (4) and configured to be in small clearance fit with the base (1); the supporting guide sleeve (4) is fixed by means of a bolt through the supporting guide sleeve mounting bolt hole (402); and the friction sleeve (404) is disposed at the top end of the supporting guide sleeve (4), and is in rigid contact with the floating platform (7).

In a preferred aspect of the present invention, the sliding supporting seat (5) comprises a sliding supporting seat cylindrical outer wall (501), a sliding supporting seat inner cavity (503) disposed at the upper end in the cylindrical outer wall (501) and sliding supporting seat threads (502) disposed at the lower end in the cylindrical outer wall (501); the sliding supporting seat (5) and the air cylinder piston rod (3) are connected by means of the sliding supporting seat threads (502); the sliding supporting seat cylindrical outer wall (501) is in sliding guiding fit with the friction sleeve (404) of the supporting guide sleeve (4); and the holder and spherical bead (6) is arranged in the sliding supporting seat inner cavity (503).

In a preferred aspect of the present invention, the center positioning shaft (13) is in the shape of a frustum, and comprises: a center positioning shaft conical surface (1301); a center positioning shaft working surface (1302) disposed at the outer side of the lower edge of the center positioning shaft (13) and having a bulge; a center positioning shaft hole (1303) disposed at the bottom of the center positioning shaft (13) and being in small clearance fit with the oil cylinder connecting rod (18); a center positioning shaft center bolt hole (1304) disposed at the bottom of the center positioning shaft (13) and fixed to the oil cylinder connecting rod (18) through a screw; a side upper portion comprising a center positioning shaft pin-shaft positioning hole (1305), the center positioning shaft pin-shaft positioning hole (1305) being configured to be in interference fit with the pin shaft (10); a center positioning shaft sliding pin hole (1306), the center positioning shaft sliding pin hole (1306) being configured to allow the push rod pin (11) to slide vertically in the center positioning shaft sliding pin hole (1306); a center positioning shaft compression avoidance groove (1307) disposed at the bottom of the center positioning shaft (13); and a center positioning shaft weight-reducing hole (1308).

In other aspects of the present invention, the following technical solution is also included:

a device of the present embodiment comprises the following components: a base 1, an air cylinder 2, an air cylinder piston and connecting rod 3, a supporting guide sleeve 4, a sliding supporting seat 5, a thrust ball bearing holder and spherical bead 6, a floating platform 7, a first connecting screw 8, a compression block 9, a pin shaft 10, a push rod pin 11, a second connecting screw 12, a center positioning shaft 13, a workpiece 14, a third connecting screw 15, a guide sleeve 16, a supporting plate 17, an oil cylinder piston and connecting rod 18 and a one-way oil cylinder 19. The base (1) is connected with the air cylinder (2) by means of a screw, the base (1) is connected with the oil cylinder (19) by means of a bolt through the supporting plate (17), and the guide sleeve (16) and the base (1) are in small clearance fit with each other and fixed with a screw; and the supporting guide sleeve mounting foot (401) of the supporting guide sleeve (4) and the base (1) are in small clearance fit with each other and fixed by means of a screw through the supporting guide sleeve mounting bolt hole (402), and the friction sleeve (404) is designed at the top end of the supporting guide sleeve (4). The center positioning shaft (13) and the oil cylinder piston and connecting rod (18) are in small clearance fit with each other through the center positioning shaft hole (1303) and connected fixedly with each other by means of the screw through the center positioning shaft center bolt hole (1304); the center positioning shaft (13) is internally provided with the center positioning shaft compression avoidance groove (1307), the center positioning shaft pin-shaft positioning hole (1305) in interference fit with the pin shaft (10) and three sliding pin holes (1306) enabling the push rod pin (11) to slide vertically in the center positioning shaft sliding pin holes (1306); and it is also provided with a center positioning shaft weight-reducing hole (1308). The sliding supporting seat (5) and the air cylinder piston rod (3) are connected by means of the sliding supporting seat threads (502), the sliding supporting seat cylindrical outer wall (501) is in sliding guiding fit with a supporting guide sleeve inner wall, and the holder and spherical bead (6) is arranged in the sliding supporting seat inner cavity (503). The floating platform (7) is arranged on the holder and spherical bead (6), and at a working state, it is arranged above the supporting seat (5) and contacts rigidly with the friction sleeve (404).

The floating centering self-clamping machining fixture of the present invention is suitable for machining flange-type parts such as wheels and the like, which can improve the positioning accuracy and machining precision and be operated simply and conveniently by means of its design. The fixture is provided with an automatic returning floating platform, thereby achieving the automatic alignment of the parts; after the alignment, a floating support moves down and is changed to a rigid support, thereby improving stability; and a positioning rod continues to move down, such that a workpiece is automatically clamped by an ejector rod oscillating arm mechanism.

BRIEF DESCRIPTION OF THE DRAWINGS

Embodiments of the present invention are described below in detail in combination with the accompanying drawings, wherein.

Figure 1:
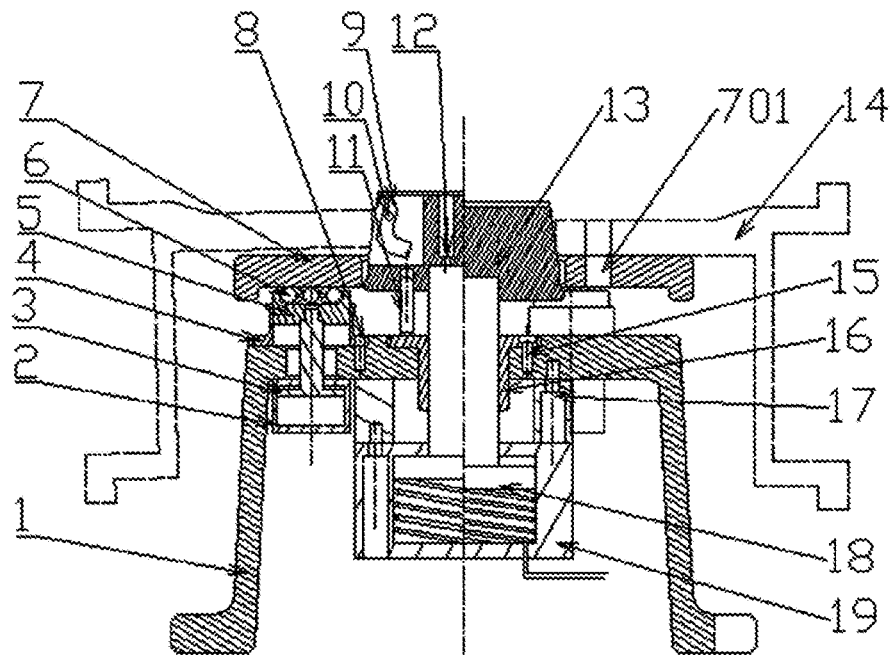
FIG. 1 is a structural schematic diagram of a machining fixture described in embodiment 1.
Figure 2:
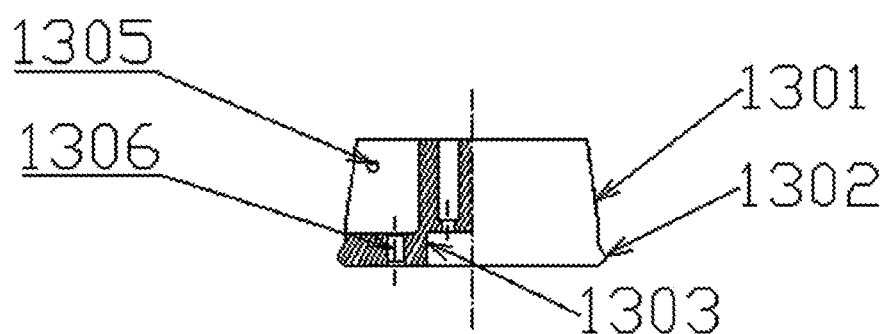
FIG. 2 is a structural schematic diagram of a center positioning shaft (13) of the machining fixture described in embodiment 1.
Figure 3:
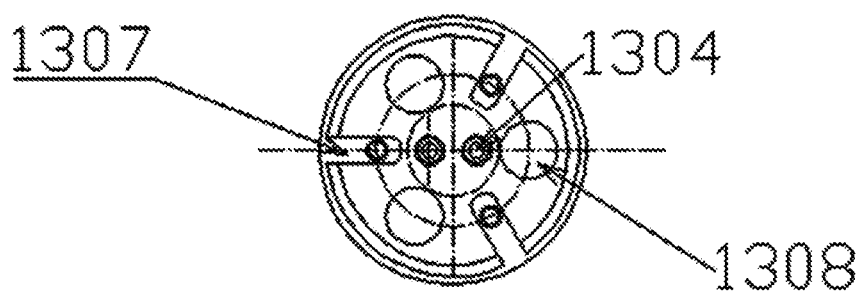
FIG. 3 is a top view of the center positioning shaft (13) of the machining fixture described in embodiment 1.
Figure 4:
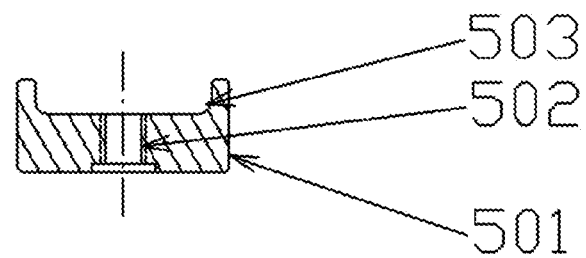
FIG. 4 is a structural schematic diagram of a sliding supporting seat (5) of the machining fixture described in embodiment 1.
Figure 5:
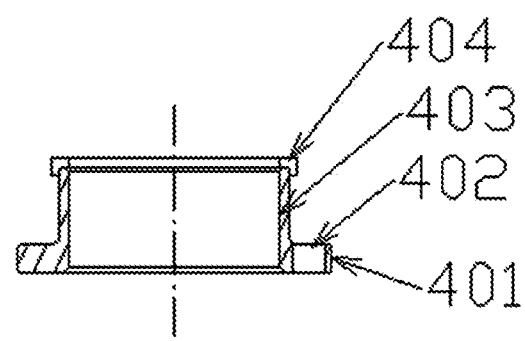
FIG. 5 is a structural schematic diagram of a supporting guide sleeve (4) of the machining fixture described in embodiment 1.

In the drawings: 1—base, 2—air cylinder, 3—air cylinder piston and connecting rod, 4—supporting guide sleeve, 5—sliding supporting seat, 6—thrust ball bearing holder and spherical bead, 7—floating platform, 8—first connecting screw, 9—compression block, 10—pin shaft, 11—push rod pin, 12—second connecting screw, 13—center positioning shaft, 14—workpiece, 15—third connecting screw, 16—guide sleeve, 17—supporting plate, 18—oil cylinder piston and connecting rod, 19—one-way oil cylinder, 401—supporting guide sleeve mounting foot, 402—supporting guide sleeve mounting bolt hole, 403—supporting guide sleeve cylindrical main body, 404—friction sleeve, 501—sliding supporting seat cylindrical outer wall, 502—sliding supporting seat thread, 503—sliding supporting seat inner cavity, 1301—center positioning shaft conical surface, 1302—center positioning shaft working surface, 1303—center positioning shaft hole, 1304—center positioning shaft center bolt hole, 1305—center positioning shaft pin-shaft positioning hole, 1306—center positioning shaft sliding pin hole, 1307—center positioning shaft compression avoidance groove, 1308—center positioning shaft weight-reducing hole.

DETAILED DESCRIPTION OF THE INVENTION

Embodiment 1

A machining fixture of the present embodiment comprises a base (1), an air cylinder (2), an air cylinder piston and connecting rod (3), a supporting guide sleeve (4), a sliding supporting seat (5), a thrust ball bearing holder and spherical bead (6), a floating platform (7), a first connecting screw (8), a compression block (9), a pin shaft (10), a push rod pin (11), a second connecting screw (12), a center positioning shaft (13), a third connecting screw (15), a guide sleeve (16), a supporting plate (17), an oil cylinder piston and connecting rod (18) and a one-way oil cylinder (19), and the machining fixture is characterized in that: the one-way oil cylinder (19) is connected to the base (1) by means of a bolt through the supporting plate (17), the guide sleeve (16) and the base (1) are in small clearance fit with each other and fixed with a screw, an oil cylinder connecting rod (18) of the one-way oil cylinder (19) penetrates through the base (1) through the guide sleeve (16), and the center positioning shaft (13) is installed to the top end of the oil cylinder piston and connecting rod (18) by means of the second connecting screw (12); the air cylinder (2) is fixed to the base (1) by means of a bolt, the supporting guide sleeve (4) and the base (1) are in small clearance fit with each other and fixed by means of the first connecting screw (8), the air cylinder piston and connecting rod (3) of the air cylinder (2) penetrates through the base (1) through the supporting guide sleeve (4) and is connected to the sliding supporting seat (5), and the holder and spherical bead (6) is arranged on the sliding supporting seat (5); the floating platform (7) is configured to be arranged on the holder and spherical bead (6) at a regulation state and on the sliding supporting seat (5) at a working state of workpiece machining; the compression block (9) and the pin shaft (10) are fixed respectively to the center positioning shaft (13) to maintain stationary; and the push rod pin (11) is arranged between the floating platform (7) and the supporting guide sleeve (4). The supporting guide sleeve (4) comprises a supporting guide sleeve mounting foot (401), a supporting guide sleeve mounting bolt hole (402), a supporting guide sleeve cylindrical main body (403) and a friction sleeve (404); the supporting guide sleeve mounting foot (401) is disposed at a bottom end the supporting guide sleeve (4) and configured to be in small clearance fit with the base (1); the supporting guide sleeve (4) is fixed by means of a bolt through the supporting guide sleeve mounting bolt hole (402); and the friction sleeve (404) is disposed at the top end of the supporting guide sleeve (4), and is in rigid contact with the floating platform (7). The sliding supporting seat (5) comprises a sliding supporting seat cylindrical outer wall (501), a sliding supporting seat inner cavity (503) disposed at the upper end in the cylindrical outer wall (501) and sliding supporting seat threads (502) disposed at the lower end in the cylindrical outer wall (501); the sliding supporting seat (5) and the air cylinder piston rod (3) are connected by means of the sliding supporting seat threads (502); the sliding supporting seat cylindrical outer wall (501) is in sliding guiding fit with the friction sleeve (404) of the supporting guide sleeve (4); and the holder and spherical bead (6) is arranged in the sliding supporting seat inner cavity (503). The center positioning shaft (13) is in the shape of a frustum, and comprises: a center positioning shaft conical surface (1301); a center positioning shaft working surface (1302) disposed at the outer side of the lower edge of the center positioning shaft (13) and having a bulge; a center positioning shaft hole (1303) disposed at the bottom of the center positioning shaft (13) and being in small clearance fit with the oil cylinder connecting rod (18); a center positioning shaft center bolt hole (1304) disposed at the bottom of the center positioning shaft (13) and fixed to the oil cylinder connecting rod (18) by means of a screw; a side upper portion comprising a center positioning shaft pin-shaft positioning hole (1305), the center positioning shaft pin-shaft positioning hole (1305) being configured to be in interference fit with the pin shaft (10); a center positioning shaft sliding pin hole (1306), the center positioning shaft sliding pin hole (1306) being configured to allow the push rod pin (11) to slide vertically in the center positioning shaft sliding pin hole (1306); a center positioning shaft compression avoidance groove (1307) disposed at the bottom of the center positioning shaft (13); and a center positioning shaft weight-reducing hole (1308).

During operation, the workpiece (14) is placed on the floating platform (7) and contacts the center positioning shaft conical surface (1301). The workpiece may be inclined slightly for 1 to 3 degrees due to the fitting with the conical surface, and under the gravity, the workpiece (14), the center positioning shaft (13) and the oil cylinder piston and connecting rod (18) are controlled by a flow valve to descend slowly. A position at the inclined end of the workpiece (14) first contacts the floating platform (7), resulting in the horizontal sliding of the floating platform (7), such that a supporting surface of the workpiece (14) is completely appressed to the upper surface of the floating platform (7). Then, the air cylinder piston and connecting rod (3), the sliding supporting seat (5) and the holder and spherical bead (6) descend together until the workpiece (14) is regulated, straightened and accurately positioned, and eventually, they continue to descend to contact the upper surface of a friction ring (404) of a supporting sliding sleeve (4) to achieve stability; and the one-way oil cylinder (19) is controlled by operation personnel to be switched on and off, such that the oil cylinder piston and connecting rod (18) and the center positioning shaft (13) continue to move down to make the push rod (11) slide relative to the center positioning shaft (13) and push the compression block (9) to compress the workpiece. At this point, the workpiece is completely installed and begins to be machined.

When the workpiece is machined completely, a switch of the one-way oil cylinder (19) is turned on, such that the workpiece (14), the one-way oil cylinder (19) and the air cylinder (2) ascend to be returned. In this process, the push rod pin (11) moves down relative to the center positioning shaft (13), the compression block (9) is opened under the action of a return spring, and the air cylinder (2) is returned first. Thereafter, the oil cylinder piston (18), the workpiece (14) and the center positioning shaft (13) continue to ascend upwards. In this process, the center positioning shaft working surface (1302) of the center positioning shaft (13) extrudes a floating platform center hole to make the center platform return to a center position so as to be prepared for the next operation.

The invention claimed is:

1. A machining fixture:
 comprising a base, an air cylinder, an air cylinder piston and connecting rod, a supporting guide sleeve, a sliding supporting seat, a thrust ball bearing holder and spherical bead, a floating platform, a first connecting screw, a compression block, a pin shaft, a push rod pin, a second connecting screw, a center positioning shaft, a third connecting screw, a guide sleeve, a supporting plate, an oil cylinder piston and connecting rod, and a one-way oil cylinder,
 wherein the one-way oil cylinder is connected to the base by a bolt through the supporting plate, the guide sleeve and the base are in small clearance fit with each other and fixed with a screw, an oil cylinder connecting rod of the one-way oil cylinder penetrates through the base through the guide sleeve, and the center positioning shaft is installed to a top end of the oil cylinder piston and connecting rod by the second connecting screw; the air cylinder is fixed to the base through a bolt, the supporting guide sleeve and the base are in small clearance fit with each other and fixed by the first connecting screw, the air cylinder piston and connecting rod of the air cylinder penetrates through the base through the supporting guide sleeve and is connected to the sliding supporting seat, and the holder and spherical bead is arranged on the sliding supporting seat; the floating platform is configured to be arranged on the holder and spherical bead at a regulation state and on the sliding supporting seat at a working state of workpiece machining; the compression block and the pin shaft are fixed respectively to the center positioning shaft to maintain stationary; and the push rod pin is arranged between the floating platform and the supporting guide sleeve,
 wherein the supporting guide sleeve comprises a supporting guide sleeve mounting foot, a supporting guide sleeve mounting bolt hole, a supporting guide sleeve cylindrical main body and a friction sleeve; the supporting guide sleeve mounting foot is disposed at a bottom end of the supporting guide sleeve and configured to be in small clearance fit with the base; the supporting guide sleeve is fixed by a bolt through the supporting guide sleeve mounting bolt hole; and the friction sleeve is disposed at the top end of the supporting guide sleeve, and is in rigid contact with the floating platform.

2. The machining fixture according to claim 1, wherein the sliding supporting seat comprises a sliding supporting seat cylindrical outer wall, a sliding supporting seat inner cavity disposed at an upper end in the cylindrical outer wall and sliding supporting seat threads disposed at a lower end in the cylindrical outer wall; the sliding supporting seat and the air cylinder piston rod are connected by the sliding supporting seat thread; the sliding supporting seat cylindrical outer wall is in sliding guiding fit with the friction sleeve of the supporting guide sleeve; and the holder and spherical bead is arranged in the sliding supporting seat inner cavity.

3. The machining fixture according to claim 1, wherein the center positioning shaft is in a shape of a frustum, and comprises: a center positioning shaft conical surface; a center positioning shaft working surface disposed at an outer side of the lower edge of the center positioning shaft and having a bulge; a center positioning shaft hole disposed at the bottom of the center positioning shaft and being in small clearance fit with the oil cylinder connecting rod; a center positioning shaft center bolt hole disposed at the bottom of the center positioning shaft and fixed to the oil cylinder connecting rod through a screw; a side upper portion comprising a center positioning shaft pin-shaft positioning hole, the center positioning shaft pin-shaft positioning hole being configured to be in interference fit with the pin shaft; a center positioning shaft sliding pin hole, the center positioning shaft sliding pin hole being configured to allow the push rod pin to slide vertically in the center positioning shaft sliding pin hole; a center positioning shaft compression avoidance groove disposed at the bottom of the center positioning shaft; and a center positioning shaft weight-reducing hole.

4. The machining fixture according to claim 1, wherein the sliding supporting seat comprises a sliding supporting seat cylindrical outer wall, a sliding supporting seat inner cavity disposed at an upper end in the cylindrical outer wall and sliding supporting seat threads disposed at a lower end in the cylindrical outer wall; the sliding supporting seat and the air cylinder piston rod are connected by the sliding supporting seat threads; the sliding supporting seat cylindrical outer wall is in sliding guiding fit with the friction sleeve of the supporting guide sleeve; and the holder and spherical bead is arranged in the sliding supporting seat inner cavity.

5. The machining fixture according to claim 1, wherein the center positioning shaft is in a shape of a frustum, and comprises: a center positioning shaft conical surface; a center positioning shaft working surface disposed at an outer side of the lower edge of the center positioning shaft and having a bulge; a center positioning shaft hole disposed at the bottom of the center positioning shaft and being in small clearance fit with the oil cylinder connecting rod; a center positioning shaft center bolt hole disposed at the bottom of the center positioning shaft and fixed to the oil cylinder connecting rod through a screw; a side upper portion comprising a center positioning shaft pin-shaft positioning hole, the center positioning shaft pin-shaft positioning hole being configured to be in interference fit with the pin shaft; a center positioning shaft sliding pin hole, the center positioning shaft sliding pin hole being configured to allow the push rod pin to slide vertically in the center positioning shaft sliding pin hole; a center positioning shaft compression avoidance groove disposed at the bottom of the center positioning shaft; and a center positioning shaft weight-reducing hole.

* * * * *